United States Patent [19]
Pierce

[11] Patent Number: 5,446,915
[45] Date of Patent: Aug. 29, 1995

[54] PARALLEL PROCESSING SYSTEM VIRTUAL CONNECTION METHOD AND APPARATUS WITH PROTECTION AND FLOW CONTROL

[75] Inventor: Paul R. Pierce, Portland, Oreg.

[73] Assignee: Intel Corporation, Santa Clara, Calif.

[21] Appl. No.: 66,579

[22] Filed: May 25, 1993

[51] Int. Cl.$^6$ .................. G06F 9/38; G06F 9/445; G06F 13/14; G06F 15/16
[52] U.S. Cl. .................. 395/800; 364/228; 364/229.4; 364/229.5; 364/230.5; 364/230.4; 364/230.6; 364/242.5; 364/247; 364/247.8; 364/254.6; 364/254.7; 364/DIG. 1; 364/DIG. 2
[58] Field of Search .............. 395/800, 375, 650, 500, 395/400, 425, 600, 775, 725, 325, 200, 250, 275, 575; 364/DIG. 1, DIG. 2

[56] References Cited

U.S. PATENT DOCUMENTS

| | | | |
|---|---|---|---|
| 4,630,196 | 12/1986 | Bednar, Jr. et al. | 395/200 |
| 4,642,758 | 2/1987 | Teng | 395/600 |
| 4,825,354 | 4/1989 | Agrawal et al. | 395/600 |

OTHER PUBLICATIONS

Applicant's statement about: Library for Thinking Machine model CM-5; Thinking Machines, Inc.; Cambridge, Massachusetts Oral Presentation.

Primary Examiner—Alyssa H. Bowler
Assistant Examiner—Daniel H. Pan
Attorney, Agent, or Firm—Blakely, Sokoloff, Taylor & Zafman

[57] ABSTRACT

A parallel processing system virtual connection method and apparatus with protection and flow control is described. In accordance with the present invention, virtual connections between processor nodes are maintained through the use of connection tables. Each connection table is comprised of a plurality of connection table entries with each entry defining one end of a virtual connection between two processor nodes. Each connection table entry, in turn, comprises a data structure which stores data used to define the virtual connection. The passage of messages or data is accomplished through the use of the data structures within each connection entry in conjunction with message passing hardware in the node. User processes in the processor nodes interact directly with the message passing hardware, without the need to call the operating systems.

6 Claims, 7 Drawing Sheets

PARALLEL PROCESSING SYSTEM VIRTUAL CONNECTION METHOD AND APPARATUS WITH PROTECTION AND FLOW CONTROL

BACKGROUND OF THE INVENTION

1. Field of the Invention

The present invention relates to the area of parallel processing systems, and more particularly, to a method and apparatus providing for virtual connections with protection and flow control within a parallel processing system.

2. Art Background

In recent years, there has been an increased interest in parallel processing systems. This increased interest is largely attributable to the fact that parallel processing systems are capable of processing data much more rapidly than traditional sequential processing systems. A high-speed parallel processing system typically consists of a plurality of processor nodes, with each of these processor nodes incorporating a processor and associated memory. The plurality of processor nodes are then linked together by a communications network which allows the processor nodes to pass messages between themselves.

A parallel processing system advantageously processes a large data processing task by breaking it up into many smaller tasks such that these smaller task can be processed by multiple data processing nodes operating in parallel. At certain junctures in this processing, messages are typically passed between the processor nodes. The speed at which the larger task can be completed is essentially limited by the speed at which the individual processor nodes process data and the speed at which the system passes messages between the processor nodes. Accordingly, message passing should ideally be as fast as possible. In addition to speed, though, message passing must provide for flexibility, and protection.

Prior art systems typically implemented message passing in software. Software implementations, however, suffer from the fact that they necessarily access an operating system whenever a message is to be passed from a first node to a second node. The need to regularly involve the operating system whenever a message is passed contributes significantly to latency. Moreover, as operating systems become more and more complex to provide for greater flexibility, it becomes increasingly difficult to utilize a software implementation to provide for high performance message passing.

Accordingly, a hardware implementation wherein the operating system is not regularly involved in the message passing would be desirable. In such a system, the message passing hardware is directly visible to user processes, thereby eliminating the overhead of the operating system. Any such hardware implementation, however, must include means for protecting the boundaries between a user application, the operating system, and other user applications. In particular, the implementation must insure that a first user process operating at a first node not be allowed to arbitrarily send a message to a second user process operating at a second node. In addition, it is important that such a hardware implementation have flow control to prevent any user process from jamming the message passing hardware.

As will be described, in accordance with the present invention, message passing in a multi-computer system is implemented in hardware directly accessible to the user processes. Moreover, as will be described, the present invention implements this message passing with protection and flow control.

SUMMARY OF THE INVENTION

The present invention finds application in the area of parallel processing systems. A multicomputer virtual connection method and apparatus with protection and flow control is described. The present invention is advantageously utilized in a mesh of processor nodes, with each processor node incorporating a processor, memory, a network interface controller, and a direct memory access device. In accordance with the present invention, virtual connections between processor nodes are maintained through the use of connection tables within each node. Each connection table is comprised of a plurality of connection table entries defining one end of a virtual connection between two processor nodes. Each connection table entry, in turn, comprises a data structure used to define the virtual connection and provide for the passage of messages between the processor nodes.

The passage of messages is accomplished through the use of the data structures within each connection entry in conjunction with message passing hardware. In at least one embodiment, the connection tables and message passing hardware are disposed within the DMA devices at each node. Each connection entry includes route and process identification data, address spaces reserved for "freeze bits" which are selectively enabled and disabled in conjunction with the performance of freeze operations, and address spaces reserved for requests to send and receive data messages.

In accordance with the present invention, the routing and process identification data for the virtual connections are initially established by the operating system kernels. Following this initialization, the user processes interact directly with the message passing hardware, without the need to call the operating systems. In particular, a user process residing in a node initiates a request to receive or send a data message by simply writing to the message passing hardware in the node. Multiple receive or send requests can be posted in a connection table entry. The message passing hardware additionally provides for protection by accessing process identification data within a connection entry whenever a user process attempts to access a connection entry. If the process identification data does not match the identity of the user process seeking access, the attempted access is denied. Flow control is maintained through the use of receive ready byte counts, flow control messages, send request byte counts, and send counts. The present invention accordingly supports virtual connections with protection and flow control within a parallel processing system.

BRIEF DESCRIPTION OF THE DRAWINGS

Further details are explained below with the help of the examples illustrated in the attached drawings in which.

DETAILED DESCRIPTION OF THE INVENTION

A multicomputer virtual connection method and apparatus with protection and flow control is described. In the following description, for purposes of explanation, numerous details are set forth such as specific bit values, message paths, word sizes, etc., in order to provide a thorough understanding of the present invention. However, it will be apparent to one skilled in the art that such specific details are not essential to the practice of the present invention. In particular, while the present invention will be described within a specific parallel processing system, it will be appreciated that the present invention is in no way limited to this particular system. As will be appreciated, the present invention finds application in any parallel processing system requiring message passing. In the description which follows, reference will be made to figures in which well known electrical structures and circuits are shown in block diagram form in order not to obscure the present invention unnecessarily.

Figure 1:
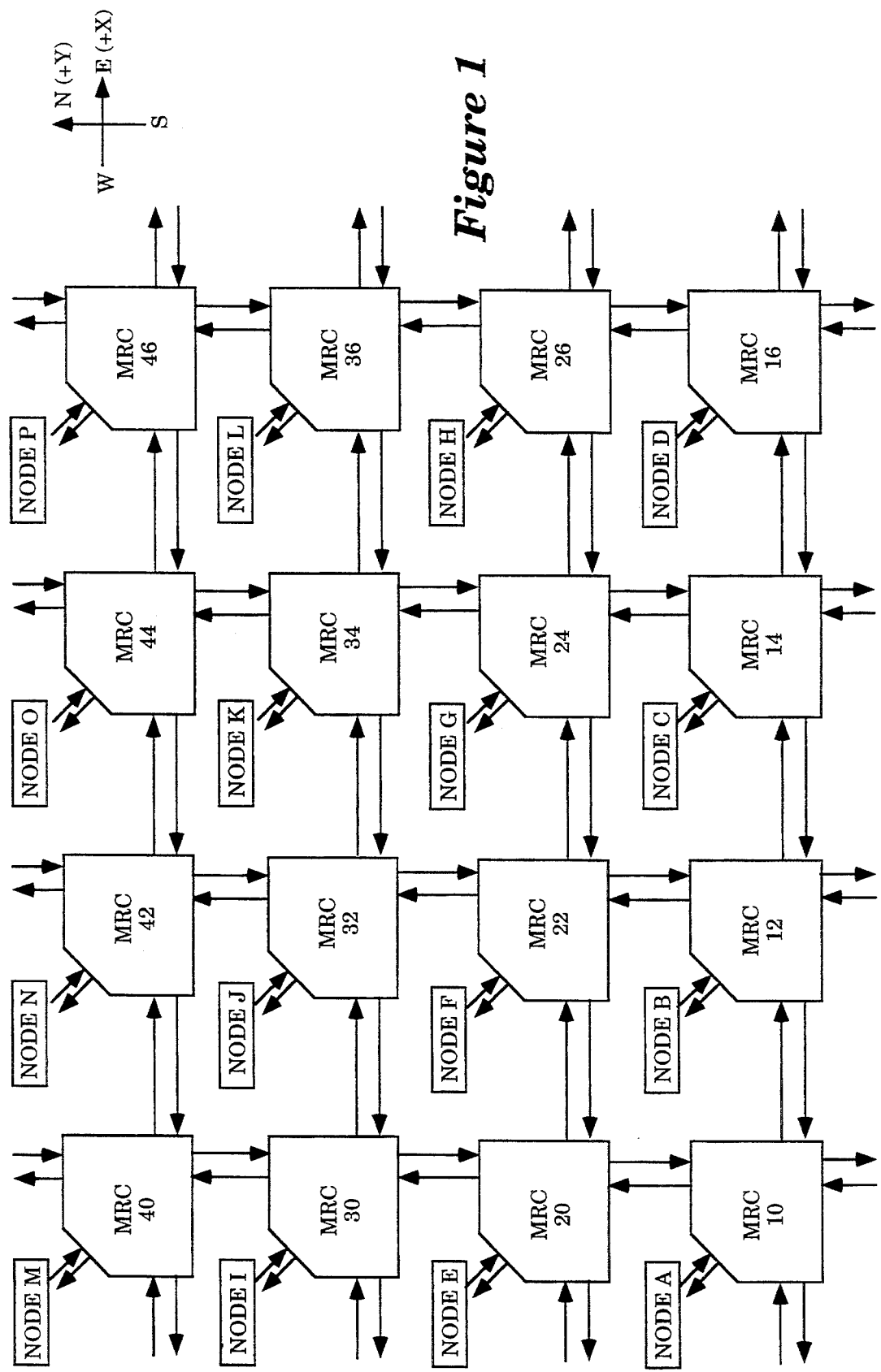
FIG. 1 illustrates a parallel processing system in which the present invention can be advantageously utilized.

Referring now to FIG. 1, this figure illustrates, in block diagram form, one possible parallel processing system in which the present invention can be advantageously utilized. FIG. 1 illustrates a two dimensional mesh of message routing chips (MRCs), including message routing chips 10, 12, 14, 16, 20, 22, 24, 26, 30, 32, 34, 36, 40, 42, 44, and 46. Each message routing chip (MRC) is coupled to a processor node. In particular, message routing chips 10, 12, 14, 16, 20, 22, 24, 26, 30, 32, 34, 36, 40, 42, 44, and 46 are coupled to processor nodes A, B, C, D, E, F, G, H, I, J, K, L, M, N, O, and P respectively. Each of the processor nodes, in turn, interfaces through a network interface controller (NIC) to an associated processor and memory (not shown in this figure).

The associated processors, together, provide for a larger parallel processing system. In such a parallel processing system, messages must be transferred between the processor nodes. The four topological "directions" in which messages can travel within the mesh architecture shown in FIG. 1 are designated as North, East, West, and South. Accordingly, as shown, each message routing chip incorporates four separate routing ports, a North routing port (N), an East routing port (E), a West routing port (W), and a South routing port (S). Each message routing chip further incorporates a processor port (P) comprising a uni-directional input port for receiving data from a processor node, and a uni-directional output port for delivering data to a processor node.

Each MRC is capable of independently and automatically routing messages, as appropriate, from its input ports to its output ports based on routing information contained in the message. Thus the array of MRCs is capable of automatically delivering a message from any node to any other node based on routing information contained in the message.

Figure 2:
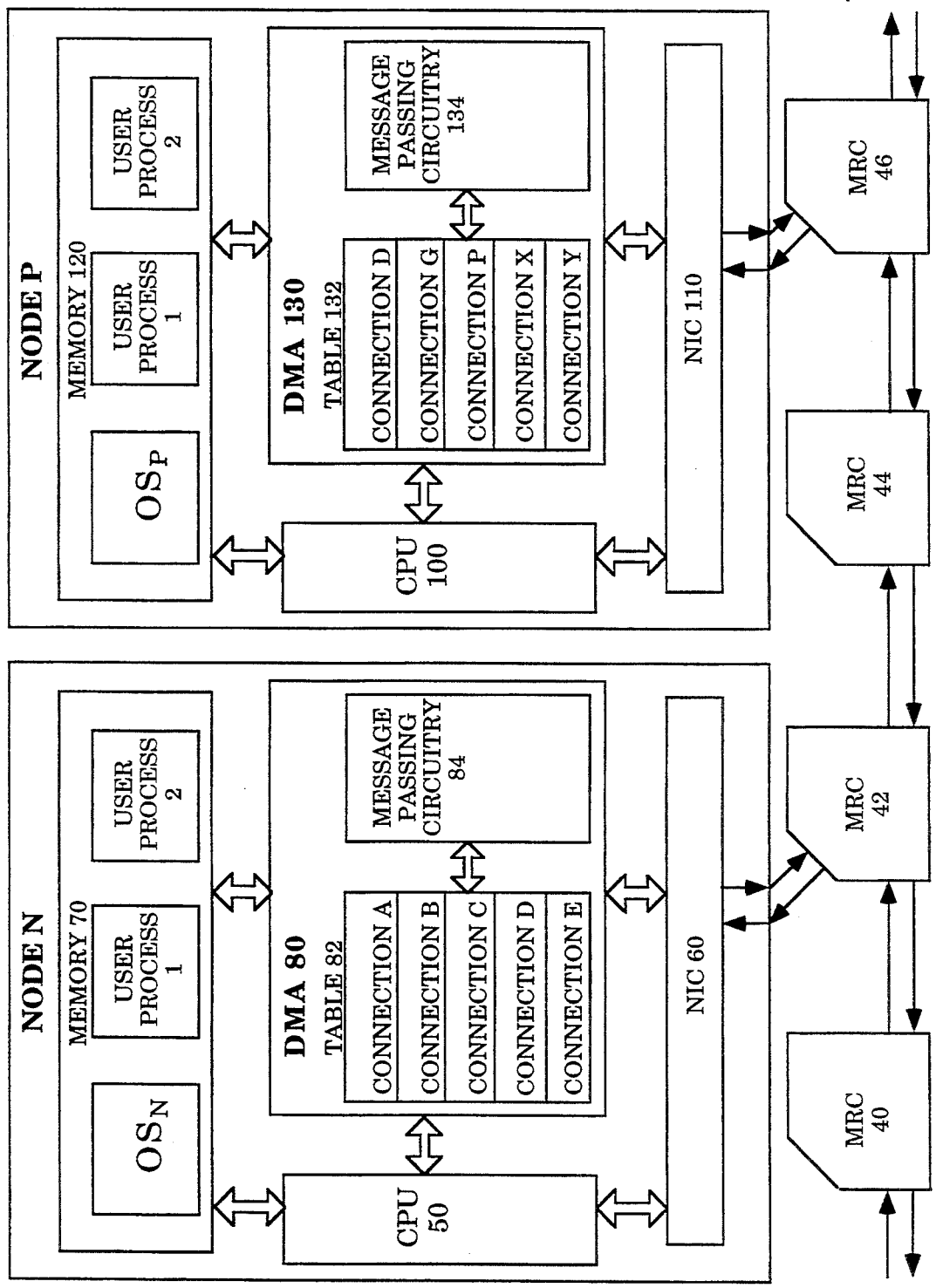
FIG. 2 illustrates the composition of two processor nodes and a first embodiment wherein the connection tables and memory passing hardware are disposed in the direct memory access devices.

Referring now to FIG. 2, this figure graphically illustrates how a virtual connection between two processor nodes is provided in accordance with the present invention. More specifically, FIG. 2 illustrates a portion of the larger mesh of processor nodes previously shown in FIG. 1, and the composition of two processor nodes, processor node N and processor node P. As illustrated in FIG. 2, processor node N is comprised of processor (CPU) 50, coupled to a network interface controller (NIC) 60, memory 70, and a direct memory access (DMA) device 80. The network interface controller 60 serves as an interface between the synchronous operation of processor node N, and the asynchronous operation of the mesh routing chip 42. Memory 70 stores the operating system ($OS_N$), as well as any user processes. Two such user processes, user process 1 and user process 2, are shown for illustrative purposes in memory 70. Direct memory access device 80 provides for accesses of memory 70 without the intervention of processor 50. In particular, direct memory access device 80 comprises circuitry and logic means providing for the copying of data from memory 70 to network interface controller 60, which then delivers the data to mesh routing chip 42 such that the data can be routed to another processor node. Direct memory access device 80 also comprises circuitry and logic means for providing for the copying of data from network interface controller 60 to memory 70 when the data are routed from another process note to network interface controller 60 via mesh routing chip 42.

In a similar fashion, processor node P is comprised of processor (CPU) 100, coupled to a network interface controller (NIC) 110, memory 120, and a direct memory access (DMA) device 130. The network interface controller 110 serves as an interface between the synchronous operation of processor node P and the asynchronous operation of mesh routing chip 46. Memory 120 stores the operating system ($OS_P$), as well as user process 1 and user process 2. DMA device 130, as a direct memory access device, incorporates circuitry which provides for accesses of memory 120 without the intervention of processor 100. In particular, direct memory access device 130 can copy data from memory 120 to network interface controller 110, which in turn, delivers the data to mesh routing chip 46 such that the data can be routed to another processor node. Direct memory access device 130 can also copy data from network interface controller 110 to memory 120 when the data are routed from another processor node to network interface controller 110 via mesh routing chip 46.

As will be described, in accordance with the present invention virtual connections are maintained through the use of connection tables. These connection tables are stored within memory storage means, for example, registers or random access memory (RAM) within each processor node. Each connection table comprises a plurality of connection table entries. Each one of these connection table entries defines one end of a virtual connection between two processor nodes and comprises a predesignated data structure which stores the data used to define the virtual connection and provide for the passage of messages.

The passage of messages is accomplished through the use of these connection tables in conjunction with message passing hardware comprised of logic circuitry and state machines. As will be described, the connection tables and message passing hardware can advantageously be disposed within the DMA devices at each node. Such DMA devices can be considered "smart" DMA devices because they are augmented with message passing circuitry. Such smart DMA devices advantageously allow a user process running in a processor node direct access to the message passing hardware and connection table entries without the intervention of an operating system. Accordingly, the operating system is separated from the run-time, performance-sensitive sending and receiving of data messages between processor nodes.

With reference to FIG. 2, this figure illustrates a first embodiment of the present invention wherein the message passing hardware and connection tables are disposed within the DMA devices. Thus, referring to the two exemplary nodes shown, in node N, the DMA device 80 incorporates a connection table 82 and message passing circuitry 84. Similarly, in node P, the DMA 130 device incorporates a connection table 132 and message passing circuitry 132. Connection tables 82 and 132 are stored within memory storage means, for example, registers or random access memory (RAM) disposed in DMA devices 80 and 130, respectively. Each connection table includes a plurality of connection table entries. As will be described, two corresponding connection table entries define the two ends of a virtual connection between two processor nodes. A plurality of connection entries are shown stored in connection table 82. These include connection entry A, connection entry B, connection entry C, connection entry D, and connection entry E. Similarly, connection table 132 stores a plurality of connection entries, including connection entry D, connection entry G, connection entry P, connection entry X, and connection entry Y. It must be noted that the number of connection entries in connection tables 82 and 132 has been chosen for purposes of simplicity of illustration. The present invention is in no way limited to this particular number of connection entries or the condition wherein every connection table in the parallel processing system contains the same number of connection entries.

Focusing now upon the nature of the connection entries, in accordance with the present invention, each connection entry in a connection table within a node must have a corresponding connection entry in a connection table within some other node. Thus, for example, connection entry A in connection table 82 has a corresponding "connection A" (not shown in this figure) in one of the other connection tables residing in one of the other nodes in the parallel processing system. It can be observed that FIG. 2 illustrates the two corresponding connection entries for connection entry D. In particular, for connection entry D in connection table 82, there is a corresponding connection entry D in connection table 132. Thus, these two connection D entries define two ends of a virtual connection between node N and node P. In operation, a user process in node N, for example, user process 1, has access to connection entry D in connection table 82, and the user process 1 in node P has access to connection entry D in connection table 132. As will be described in greater detail, the information contained in each of these connection entries facilitates the passage of messages between node N and node P. For example, through the virtual connection defined by these two connection entries, a message can travel from node N to node P, passing from the memory 70 of user process 1 under control of connection entry D in DMA 80, through NIC 60, MRC 42, MRC 44, MRC 46, NIC 110, to the memory 120 of user process 1 under control of connection entry D in DMA 130.

Figure 3:
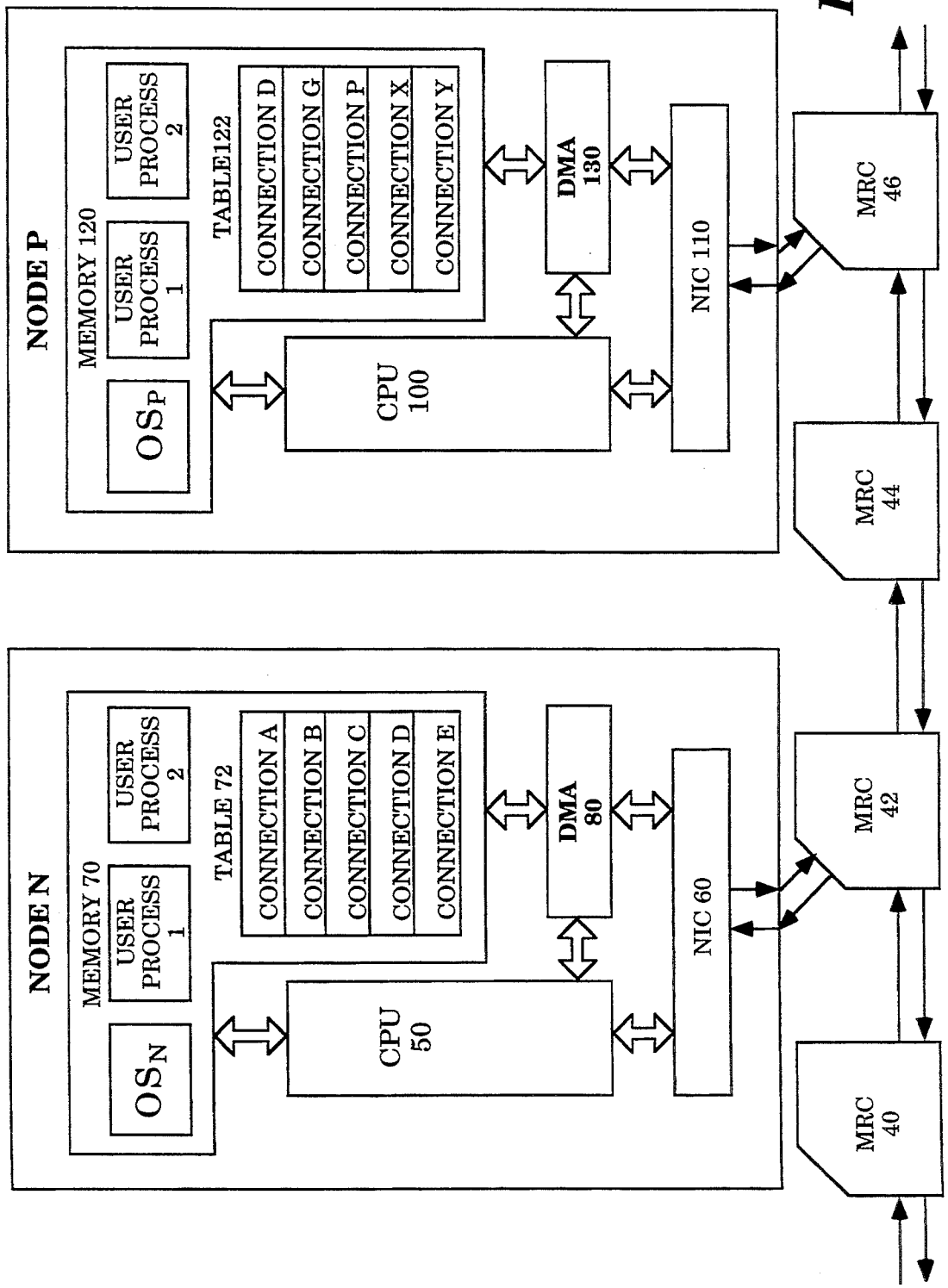
FIG. 3 illustrates the composition of two processor nodes and a second embodiment wherein the connection tables are disposed in main memory.

Referring briefly to FIG. 3, this figure illustrates an alternative embodiment of the present invention, similar to the first embodiment shown in FIG. 2, with the difference that the connection tables are disposed within memory 70 and memory 120, rather than DMA device 80 and DMA device 130. Thus, as shown in FIG. 3, memory 70 incorporates a connection table 72 with a plurality of connection table entries, including connection entry A, connection entry B, connection entry C, connection entry D, and connection entry E. Similarly, memory 120 incorporates a connection table 122 with a plurality of connection table entries, including connection entry D, connection entry G, connection entry P, connection entry X, and connection entry Y. In this embodiment, virtual connections can be supported in at least two possible ways. In a first software implementation, processor 50 and processor 100 support and manage the virtual connections found in memory 70 and memory 120. In this implementation, DMA device 80 and DMA device 130 do not incorporate message passing circuitry and are simply utilized by the processors 50 and 100 in accordance with message passing software. It will be appreciated that this implementation suffers from the fact that an operating system is accessed whenever a message is passed. However, this implementation may yield satisfactory results if the overall message passing method is sufficiently streamlined. In particular, this software implementation may provide relatively high performance results if the data structures and method of effecting message transfers which will be described are utilized. In an alternative, hybrid hardware implementation (not shown), DMA device 80 and DMA device 130 incorporate message passing hardware as in the first embodiment but the DMA devices access the connection tables in memory 70 and memory 120 to accomplish message passing.

Figure 4:
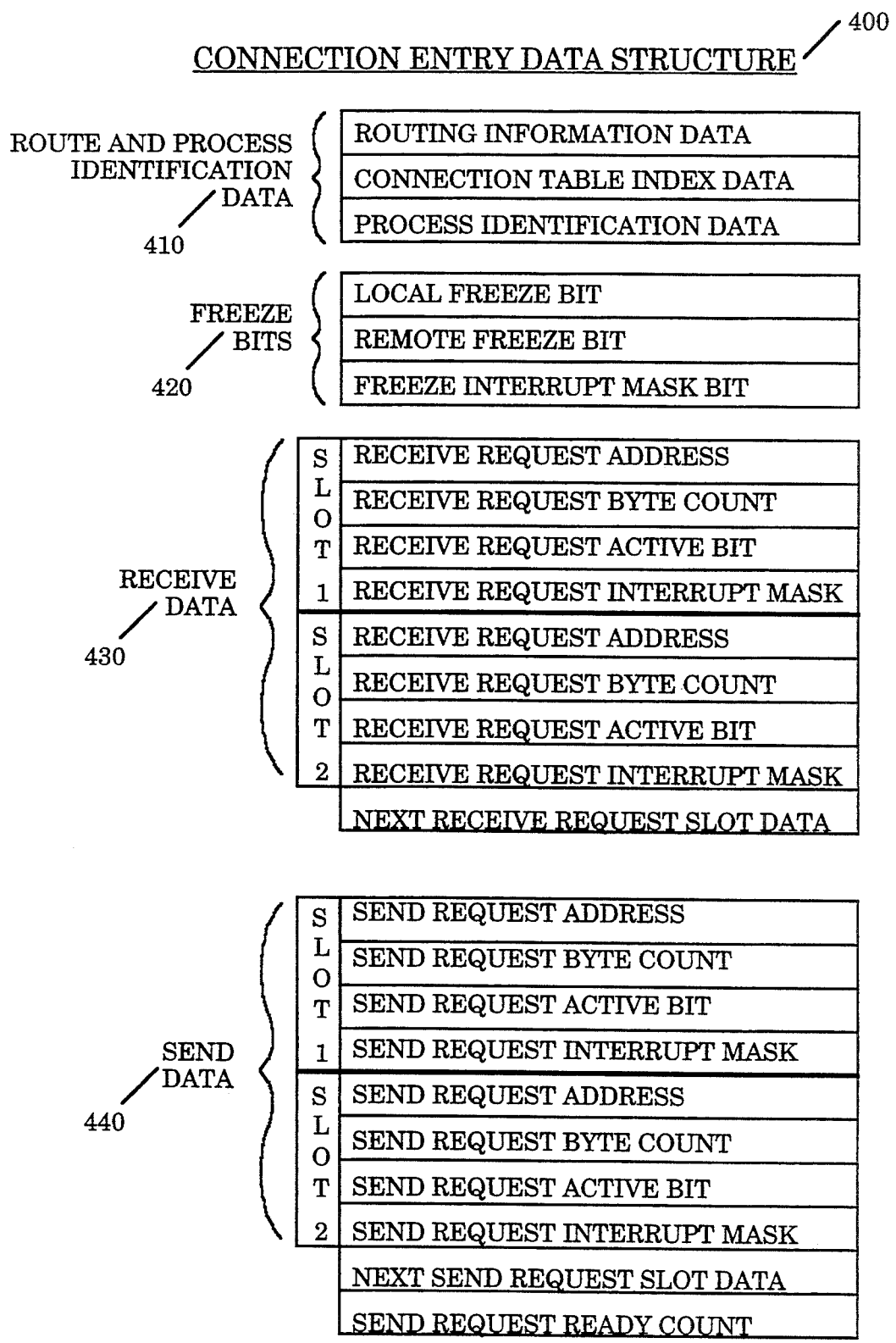
FIG. 4 illustrates the data structure of a connection table entry.

Referring now to FIG. 4, this figure illustrates the data structure 400 for each connection entry in a connection table in accordance with the present invention. In the description which follows, a first connection table will be assumed to reside in circuitry within a "local" node, such that each connection entry in the table defines a connection to some other "remote" node. Additional references to FIG. 2 will be used to provide additional insight into the data structure for each connection entry, but should not be taken as statements indicating that the present invention is limited to this particular system.

In accordance with the present invention, each connection entry stores route and process identification data 410. The first piece of route and process identification data 410 stored in a connection entry is routing information data. Routing information data comprises the information needed to route a message from the local node to the remote node. Using connection D in the connection table 82 shown in FIG. 2 as an example, the routing information data would comprise information which NIC 60, MRC 42, MRC 44, MRC 46, and NIC 110 need to successfully route the message from node N to node P. It will be appreciated that this routing information data can take any number of forms. It can, for example, comprise a routing header which is prepended to the message to be passed from node N to node P. The prepended routing header is then adjusted, for example, decremented and/or stripped, as the message is passed through MRC 42, MRC 44, and MRC 46. Such a routing header might comprise, for example, 20 bits of routing information data. Alternatively, the routing information data can simply comprise a node number understood by all the elements in the parallel processing system as the designation for node P.

Returning to FIG. 4, the second piece of route and process identification data 410 stored in each connection entry is connection table index data. Connection table index data defines the location of the corresponding connection entry within the connection table at the remote node. With reference to FIG. 2 and connection D in connection table 82, for example, the connection table index data would comprise an index to connection D in connection table 132. The connection table index data can comprise, for example, 10 bits, thereby providing for the ability to reference over 1000 connection entries in the remote node. It will readily be appreciated that this number can be varied dependent upon the maximum number of connection table entries the parallel processing system is expected to utilize in the nodes.

Referring again to FIG. 4, the third piece of route and process identification data 410 is process identification data. Process identification data is stored for each connection entry and identifies the user process that owns or controls the particular connection. Thus, in FIG. 2, for example, the process identification data for connection entry D in table 82 might identify user process 1 as the process which owns connection entry D. Process identification data can be utilized to enforce protection in the parallel processing system. Assume, for example, user process 2 running on node N attempts to access connection entry D in table 82 which is owned by user process 1. In accordance with the present invention, user process 2 initially requests access to connection entry D by writing a receive or sent request to message passing circuitry 84. The message passing circuitry 84 then compares the process identification data at connection D with data identifying the process currently running on the node, in this case, user process 2. If they do not match, as would be the case here, the message passing circuitry 84 in the DMA device 80 prevents user process 2 from using connection entry D.

In an alternative embodiment (not shown), process identification data are not stored for each connection entry. Instead, memory mapping is used, for example, a base and limit register is incorporated in the DMA device 80 such that the operating system initializes the base register and the limit register with predetermined values whenever a particular process is run. The predetermined values stored in the base register and limit register define the locations of the connections owned by a particular process. Thus, when a particular process is running, anytime it gives a local index to the DMA device 80, the device adds the index to the base value in the base register and checks the result against the limit. If the result is greater than the limit, the particular process is prevented from accessing the connection.

Referring to FIG. 4, each connection entry has a number of address spaces reserved for "freeze bits 420" Freeze bits 420 are selectively enabled and disabled in conjunction with the performance of freeze operations. Freeze operations are used when an operating system wishes to prevent user processes from accessing a particular connection entry. The need to prevent accesses to a particular connection entry can be expected to arise when the operating system needs to build up, tear down, or save and restore connection entries. As shown in FIG. 4, in the present embodiment, three freeze bits 420 are stored for each connection entry. The local freeze bit is reserved for indicating that the connection entry in this local node is frozen. The remote freeze bit is reserved for indicating that the corresponding connection entry at the remote node is frozen. The freeze interrupt mask bit, when enabled, indicates that the operating system should be given an interrupt signal when a freeze message arrives.

A freeze operation can be described through reference to both FIGS. 2 and 4. Assume that $OS_N$ in node N wants to freeze connection entry D. $OS_N$ initially sets the local freeze bit in connection entry D in connection table 82. The setting of the local freeze bit causes the message passing circuitry 84 in DMA device 80 to cause a freeze message to be sent to node P. The setting of the local freeze bit in node N further prevents any user processes in node N from accessing connection entry D in connection table 82 until this bit is disabled. The freeze message comprises the aforementioned routing information data, connection index data, and a predesignated number of bits indicating a freeze for this connection entry is desired. When the freeze message arrives at node P, the message passing circuitry 134 in DMA device 130 accesses connection entry D indicated by the connection index data, and sets the local and remote freeze bits in connection entry D. (If the freeze interrupt mask in connection entry D in table 132 is set, an interrupt of $OS_P$ occurs.)

After setting the freeze bits in connection entry D in table 132, the message passing circuitry 134 in DMA device 130 sends a return freeze message back to node N using routing information data and connection table index data drawn from connection entry D in table 132. When this return freeze message arrives at node N, the message passing circuit 84 in DMA device 80 sets the remote freeze bit, and if the interrupt mask bit was enabled in connection D in table 82, $OS_N$ is interrupted. At this point, $OS_N$ concludes that the freeze operation is complete. The operating system can now safely manipulate connection entry D. Following any manipulation, $OS_N$ clears the local freeze bit, and the message passing circuitry 84 generates a thaw message which is sent to node P. When the thaw message arrives at node P, it causes the message passing circuitry 132 in DMA device 130 to clear the remote and local freeze bits in connection entry D in connection table 132. The message passing circuitry 132 in DMA device 130 then sends a return thaw message to node N, and in response, the message passing circuitry 84 in DMA device 80 clears the remote freeze bit in connection entry D in table 82.

Returning now to FIG. 4, a number of storage spaces in a connection entry are reserved for requests to send and receive data messages. The storage spaces in the connection entry pertaining to requests to receive data are grouped as "Receive Data." In accordance with the present invention, a user process in a local node which wants to receive a data message from a remote node, initially writes a receive request to the appropriate connection entry in the local connection table. A plurality of slots can be provided in each connection entry such that a plurality of receive requests can be posted. Posting multiple receive requests would indicate the desire of the user process in the local node to obtain a first piece of data from the remote node, then a second piece of data from the remote node, etc. While FIG. 4 illustrates two such receive request slots, the present invention is in no way limited to this number of receive request slots. In particular, the present invention finds ready application to implementations providing for the posting of lesser or greater numbers of receive requests in a connection entry.

For each receive request, the user process specifies a receive request address and a receive request byte count for that address. When the receive request is posted, a receive request active bit is also enabled to indicate the validity of the receive request. The local user process can further selectively specify whether it wishes to be interrupted after the receive request is satisfied by enabling the receive request interrupt mask. In order to manage the posting of the receive request slots, data indicating the next receive request slot are also maintained in the connection entry. These data can, for example, be incremented like counters whenever a receive request is posted, and referenced prior to the posting of each receive request. A counter can thus be used to determine the proper slot for each incoming receive request.

Several address spaces in each connection entry are reserved for requests to send data messages. As shown in FIG. 4, the data structure for the send data 440 sides is similar that of the receive data 430 side. The send data address spaces store send request addresses, send request byte counts, send request active bits, and send request interrupt masks. As will be described in further detail, the send data 440 side further utilizes a flow control mechanism which insures that a local node does not send data 430 to a remote node unless there has been a request for the data, and it is further known how many bytes the remote node has requested. In accordance with the present invention, the number of bytes remaining to be sent in response to a request for data is stored in a send request ready count.

Figure 5A:
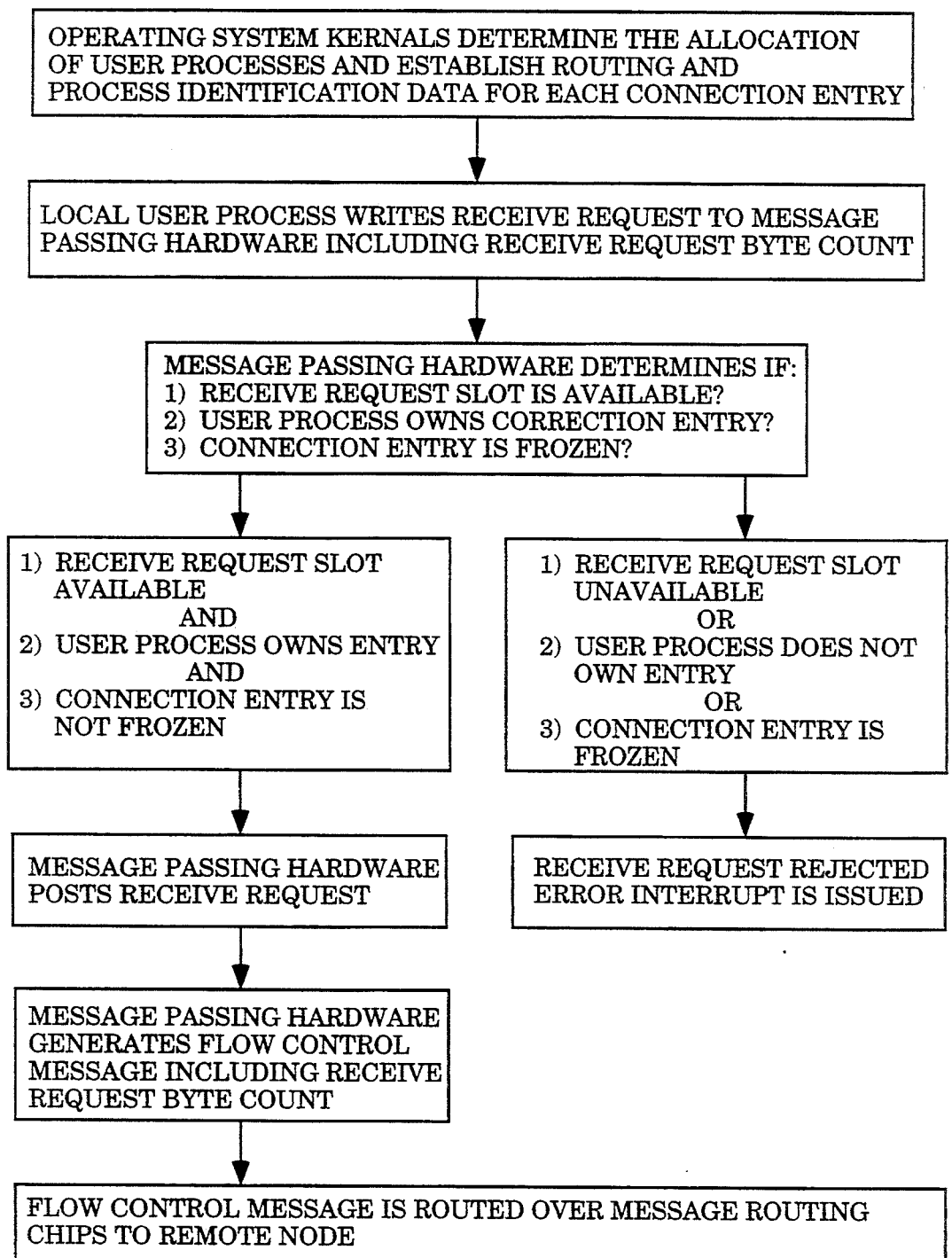
FIGS. 5A and 5B, are contiguous illustrations of a flow chart showing the process of establishing and utilizing connection entries to effect a data message transfer.
Figure 5B:
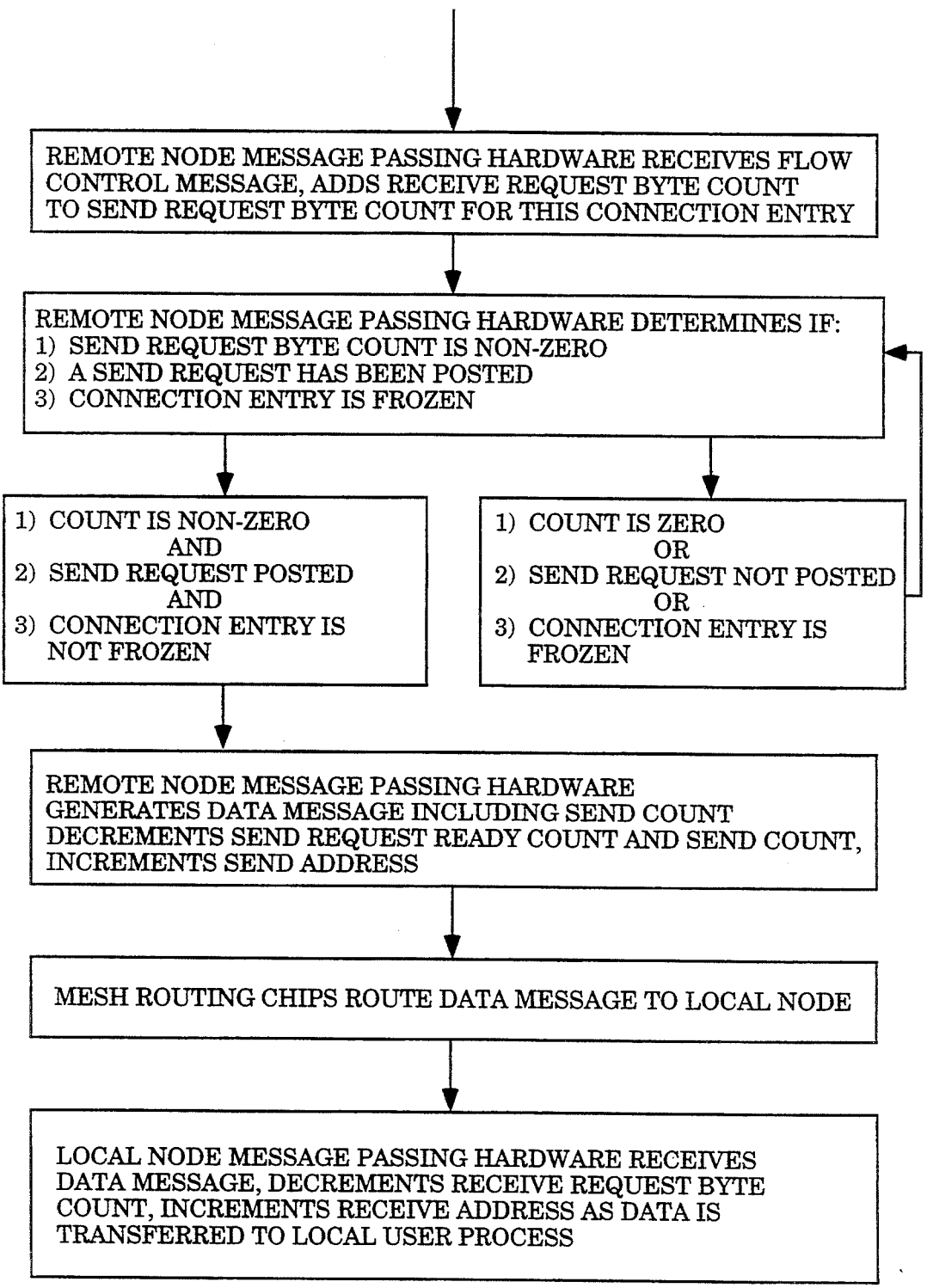
Figure 6:
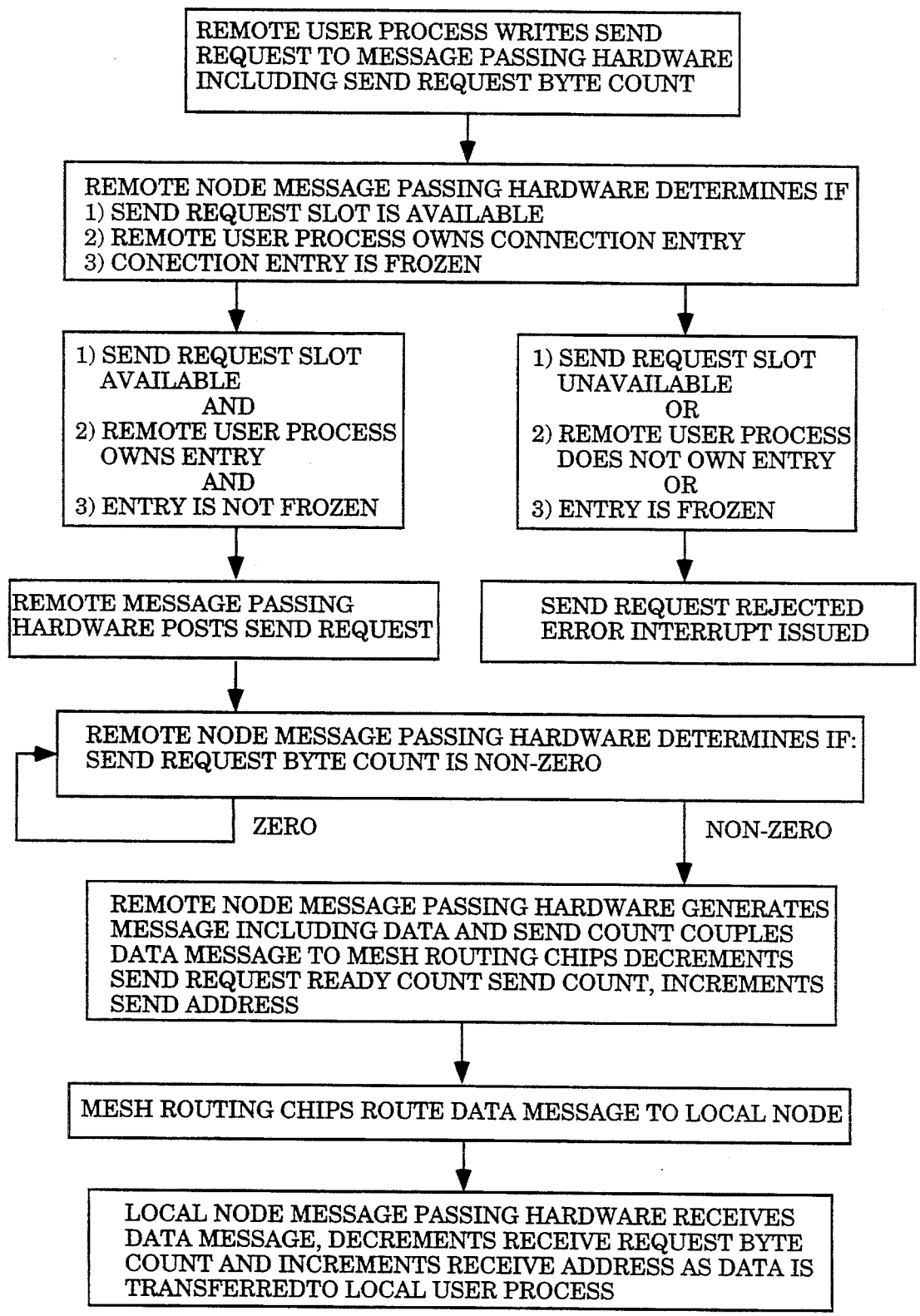
FIG. 6 is a flow chart describing the posting of a request to send data.

Referring now to the flow charts shown in FIGS. 5A, 5B and 6, these flow charts summarize the method of establishing and utilizing the connection tables with connection entries comprising the data structures described above. In particular, FIGS. 5A and 5B summarize the posting of a receive request in a local node with a resulting data message transfer from a remote node, while FIG. 6 summarizes the posting of a send request in a node such as the remote node. The term message passing hardware as used in these figures corresponds to logic circuitry and state machines within each node configured to operate in accordance with the described operations. In FIG. 2, this message passing hardware would correspond to the message passing circuitry 82 and 134 disposed within DMA devices 80 and 130, respectively. Alternatively, a software implementation programmed to operate in conformity with the operations summarized in these figures could be used in conjunction with the connection tables. In such an alternative embodiment, it will be appreciated by those skilled in the art, appropriate modifications would be made.

Referring now to FIG. 5A, initially, the operating system kernels at the various nodes communicate with one another regarding the processing of a task or tasks in the parallel processing system. Through these communications, taking place for example, through remote procedure calls at a higher level than the virtual connection system of the present invention, the operating system kernels determine the allocation of user processes, as well as the establishment of the routing and process identification data for each connection table entry in each node. In accordance with the present invention, the user programs at the nodes cannot change this routing and process identification stored in the connection tables. This protection can be accomplished by keeping this information in address spaces which are only in kernel address space.

The step which follows the use of the operating system kernels to initialize the routing and process identification data for each connection table entry underscores a fundamental attribute of the present invention. In particular, once this initialization is accomplished, the user processes are able to interact directly with the message passing hardware, without the need to call the operating systems. In other words, the message passing hardware and connection tables are directly accessible to the user processes. Thus, because a user process does not have to call the operating system whenever it wants to send or receive a message, it advantageously does not incur the overhead of executing the numerous instructions typically required to get into the operating system. Instead, a user process residing in a local node initiates a request to receive or send by performing a single write operation to the message passing hardware in the local node.

FIG. 5A illustrates this initial step. The user process residing in a local node initiates a request to receive data from a remote node by writing to the message passing hardware in the local node. This receive request specifies a connection entry, a receive request address and a receive request byte count. In response to this receive request, the message passing hardware determines whether a receive request slot is available by referencing the next receive request slot data at this connection entry. Concurrent with this determination, the message passing hardware also determines whether the process identification data at this connection entry matches the user process currently running and whether the connection entry is frozen or not. If there is no slot available for the receive request, or the process identification data does not match, or the connection entry is frozen, the receive request is rejected, and the message passing hardware issues an error interrupt. Alternatively, if there is a receive request slot available, and the process identification data does match, and the connection entry is not frozen, the message passing hardware posts the receive request in the slot. In particular, the message passing hardware posts the receive request address, the receive request byte count, and any interrupt desired by the user process in the receive request interrupt mask. The message passing hardware additionally sets the receive request active bit and increments (or flips) the next receive request slot to be ready for the next request.

Following this posting, the message passing hardware generates a flow control message comprised of the route information data and the connection index data from the connection entry, the byte count from the receive request, and an indication that this is a flow control message. This flow control message is then coupled to the network interface controller of the node, and thereafter, routed over the appropriate mesh routing chips (based upon the routing information data) to the remote node.

Referring now to FIG. 5B, When the message arrives at the remote node, the message passing hardware at the remote node reads out the message, uses the connection index data provided in the message to access the corresponding connection entry, and adds the receive request byte count to the send request ready count at that connection entry. The send request ready count now indicates to the remote node how much data it can send. Assuming the send request ready count is non-zero, a send request at the remote node has been posted for this connection entry, and the freeze bits have not been set, the remote node message passing hardware generates a data message to be sent to the local node. Thus, when a flow control message arrives at the remote node, the send request count becomes nonzero, and there is either a send request posted at the remote node, or there is not. If there is a send request posted, as will be described below, the remote node message passing hardware generates a data transfer message. If there is not a send request posted, the message passing hardware waits for a send request to be posted before generating this data message. The posting of a send request in a node such as the remote node will now be described.

Referring briefly now to FIG. 6, this figure illustrates the process of posting a send request in a node such as the remote node. When a user process writes a send request to the connection table, the message passing hardware accesses the indicated connection, and determines whether a send request slot is available by referencing the next send request slot data at this connection entry. Concurrent with this determination, the message passing hardware determines whether the process identification data at this connection entry matches that of the user process currently running and whether the connection entry is frozen. If there is no slot available for the send request, or the process identification data does not match, or the connection entry is frozen, the send request is rejected and an error interrupt is issued from the message passing hardware. Alternatively, if there is a send request slot available, and the process identification data does match, and the connection entry is not frozen, the message passing hardware posts the send request in the slot. In particular, the message passing hardware posts the send request address, the send request byte count and any interrupt desired by the user process in the send request interrupt mask. The message passing hardware additionally sets the send request active bit and increments (or flips) the next send request slot to be ready for the next request. Unlike the receive request procedure, the posting of a send request does not result in the sending of a flow control message. Instead, as will be described, the posting of the send request in the remote node may or may not result in the generation and sending of a data message.

Returning now to the description of a receive request and FIGS. 5B, the response of the message passing hardware at the remote node in response to the receive request will depend upon a number of factors. In particular, the remote node message passing hardware determines if there is an active send request at the connection entry, the send request ready count is non-zero, and the connection entry is frozen. If there is an active send request at the connection entry, the send request ready count is non-zero, and the connection entry is not frozen, the remote node message passing hardware will generate a data message. The data message is comprised of the routing information data and connection index data from the remote connection entry, data, and a send count. The send count can comprise, for example, the minimum of the send request byte count and the send request ready count. Alternatively, to provide for automatic packetization the value of the maximum packet size allowed in the system can be used to determined the send count. In particular, the send count can comprise the minimum of the send request byte count, the send request ready count, and the maximum packet size. The message passing hardware at the remote node then transfers "count" bytes of data from the memory denoted by the send request address into the NIC, and across the MRCs with an end of data (EOD) indication on the last transfer. As the data is sent from the remote node, the send request ready count and the send request byte count are decremented and the send request address is incremented. If and when the send request byte count reaches zero, the message passing hardware clears the send request active bit and generates an interrupt if the send request interrupt mask bit is set.

When the data message arrives at the local node, the local node message passing hardware reads it out and accesses the indicated connection entry. It then begins a data transfer to the user process which initiated the receive request to the memory denoted by the receive request address. As the data is transferred, the receive request byte count is decremented and the receive request address is incremented. If and when the receive request byte count reaches zero, the message passing hardware clears the receive request active bit and generates an interrupt if the receive request interrupt mask bit is set. In an alternative embodiment not utilizing the receive request interrupt mask, the user process can read the receive request active bit to determine when the receive request goes inactive. If the receive request byte count goes to zero before the send count goes to zero, the message passing hardware at the local node starts a data transfer to the next active receive request in this connection entry and updates its data structure accordingly. It will be appreciated that the foregoing process does not allow for a condition wherein a data message arrives at the local node and there are not enough active receive ready byte counts to place the data in memory.

While the present invention has been particularly described with reference to FIGS. 1 through 6, it should be understood that these figures are for illustration only and should not be taken as limitations upon the invention. In particular, while the present invention has been described as advantageously implemented in message passing hardware, the above described data structures can also be utilized in conjunction with message passing software disposed within memory. It is further contemplated that many changes and modifications may be made to the invention, by one of ordinary skill in the art, without departing from the spirit and scope of the invention as disclosed herein.

I claim:

1. In a parallel processing system including a first processor node including a first operating system, a first user process, and message passing circuitry, a second processor node including a second operating system, and second message passing circuitry, and routing means coupled to said first message passing circuitry and said second message passing circuitry, a method for providing and utilizing a virtual connection between said second processor node and said first processor node, said method comprising the steps of:

said first and second operating systems establishing in said first processor node a first connection table including a first connection entry comprising a first data structure;

said first and second operating systems establishing in said second processor node a second connection table including a second connection entry comprising a second data structure;

wherein said first connection entry defines a first end of said virtual connection and said second connection entry defines a second end of said virtual connection;

wherein the following steps are accomplished without accessing said first and second operating systems:

said first user process coupling a first signal to said first message passing circuitry;

said first message passing circuit responsive to said first signal utilizing said first data structure to couple a flow control message to said routing means;

said routing means responsively coupling said flow control message to said second message routing circuitry in said second processor node;

said second message routing circuitry responsive to said flow control message, utilizing said second data structure to couple a data message to said routing means;

said routing means responsively coupling said data message to said first message passing circuitry;

said first message passing circuit responsively coupling said data message to said first user process.

2. The method for providing and utilizing a virtual connection as provided in claim 1, wherein said first signal includes a receive request byte count, said first data structure stores said receive request byte count, said second data structure includes a send request byte count, and said receive request byte count and said send request byte count are utilized by said first message passing circuit and said second message passing circuit to control the flow of data in said data message.

3. In a parallel processing system including a first processor node including a first operating system, a first user process, and message passing circuitry, a second processor node including a second operating system, and second message passing circuitry, and routing means coupled to said first message passing circuitry and said second message passing circuitry, an apparatus for providing and utilizing a virtual connection between said second processor node and said first processor node comprising:

first connection table means for said first and second operating systems to establish in said first processor node a first connection table including a first connection entry comprising a first data structure;

second connection table means for said first and second operating systems to establish in said second processor node a second connection table including a second connection entry comprising a second data structure;

wherein said first connection entry defines a first end of said virtual connection and said second connection entry defines a second end of said virtual connection;

means for said first user process to couple a first signal to said first message passing circuitry without accessing said first and second operating systems;

means for said first message passing circuit responsive to said first signal to utilize said first data structure to couple a flow control message to said routing means without accessing said first and second operating systems;

means for said routing means to responsively couple said flow control message to said second message routing circuitry in said second processor node without accessing said first and second operating systems;

means for said second message routing circuitry responsive to said flow control message, to utilize said second data structure to couple a data message to said routing means without accessing said first and second operating systems;

means for said routing means to responsively couple said data message to said first message passing circuitry without accessing said first and second operating systems; and means for said first message passing circuit to responsively couple said data message to said first user process without accessing said first and second operating systems.

4. The apparatus for providing and utilizing a virtual connection as provided in claim 3, wherein said first; signal includes a receive request byte count, said first data structure stores said receive request byte count, said second data structure includes a send request byte count, and said receive request byte count and said send request byte count are utilized by said first message passing circuit and said second message passing circuit to control the flow of data in said data message.

5. A parallel processing system comprising:

a first processor node including a first operating system, a first user process, and message passing circuitry a second processor node including a second operating system, and second message passing circuitry;

routing means coupled to said first message passing circuitry of said first processor node and said second message passing circuitry of said second processor node; and an apparatus for providing and utilizing a virtual connection between said second processor node and said first processor node comprising:

first connection table means for said first and second operating systems to establish in said first processor node a first connection table including a first connection entry comprising a first data structure;

second connection table means for said first and second operating systems to establish in said second processor node a second connection table including a second connection entry comprising a second data structure;

wherein said first connection entry defines a first end of said virtual connection and said second connection entry defines a second end of said virtual connection;

means for said first user process to couple a first signal to said first message passing circuitry without accessing said first and second operating systems;

means for said first message passing circuit responsive to said first signal to utilize said first data structure to couple a flow control message to said routing means without accessing said first and second operating systems;

means for said routing means to responsively couple said flow control message to said second message routing circuitry in said second processor node without accessing said first and second operating systems;

means for said second message routing circuitry responsive to said flow control message, to utilize said second data structure to couple a data message to said routing means without accessing said first and second operating systems;

means for said routing means to responsively couple said data message to said first message passing circuitry without accessing said first and second operating systems; and means for said first message passing circuit to responsively couple said data message to said first user process without accessing said first and second operating systems.

6. The parallel processing system as provided in claim 5, wherein, said first signal includes a receive request byte count, said first data structure stores said receive request byte count, said second data structure includes a send request byte count, and said receive request byte count and said send request byte count are utilized by said first message passing circuit and said second message passing circuit to control the flow of data in said data message.

* * * * *